United States Patent [19]

Boyd

[11] Patent Number: 5,011,353
[45] Date of Patent: Apr. 30, 1991

[54] HIGH TEMPERATURE TURBINE ENGINE STRUCTURE

[75] Inventor: Gary L. Boyd, Tempe, Ariz.

[73] Assignee: Allied-Signal Inc., Morris Township, Morris County, N.J.

[21] Appl. No.: 280,760

[22] Filed: Dec. 6, 1988

[51] Int. Cl.⁵ ............................................. F16B 35/02
[52] U.S. Cl. ................................... 411/383; 411/396; 411/900; 403/341
[58] Field of Search ............... 411/383, 384, 396, 397, 411/900; 403/331, 341, 381; 52/410, 506, 512

[56] References Cited

U.S. PATENT DOCUMENTS

| 808,627 | 1/1906 | Booth . | |
|---|---|---|---|
| 845,121 | 2/1907 | Reniff . | |
| 1,370,474 | 3/1921 | Newsom . | |
| 1,407,548 | 2/1922 | Knouff . | |
| 1,750,770 | 3/1930 | Austin . | |
| 2,333,986 | 11/1943 | Crayton | 403/331 |
| 2,334,449 | 11/1943 | Strait | 403/331 |
| 2,538,396 | 1/1951 | Sutin . | |
| 2,590,175 | 3/1952 | Hajdu . | |
| 3,031,049 | 4/1962 | Somville . | |
| 3,112,547 | 12/1963 | Poe . | |
| 3,208,035 | 9/1965 | Horvath et al. . | |
| 3,316,861 | 5/1967 | Dailey . | |
| 3,523,395 | 8/1970 | Rutter et al. | 52/506 |
| 4,030,261 | 6/1977 | Coleman | 52/506 |
| 4,122,605 | 10/1978 | Hirabayashi et al. . | |
| 4,157,001 | 6/1979 | Pickles | 52/410 |
| 4,391,434 | 7/1983 | LaBate . | |
| 4,784,554 | 11/1988 | Break | 411/383 |

FOREIGN PATENT DOCUMENTS 962057 6/1964 United Kingdom .
1312339 4/1973 United Kingdom .

OTHER PUBLICATIONS

Patent Abstracts of Japan Pub. #58178900.
Patent Abstracts of Japan Pub. #55107120.

Primary Examiner—Neill R. Wilson
Attorney, Agent, or Firm—Terry L. Miller; James W. McFarland; Robert A. Walsh

[57] ABSTRACT

A hybrid ceramic/metallic fastener (bolt) includes a headed ceramic shank carrying a metallic end termination fitting. A conventional cap screw threadably engages the termination fitting to apply tensile force to the fastener.

12 Claims, 2 Drawing Sheets

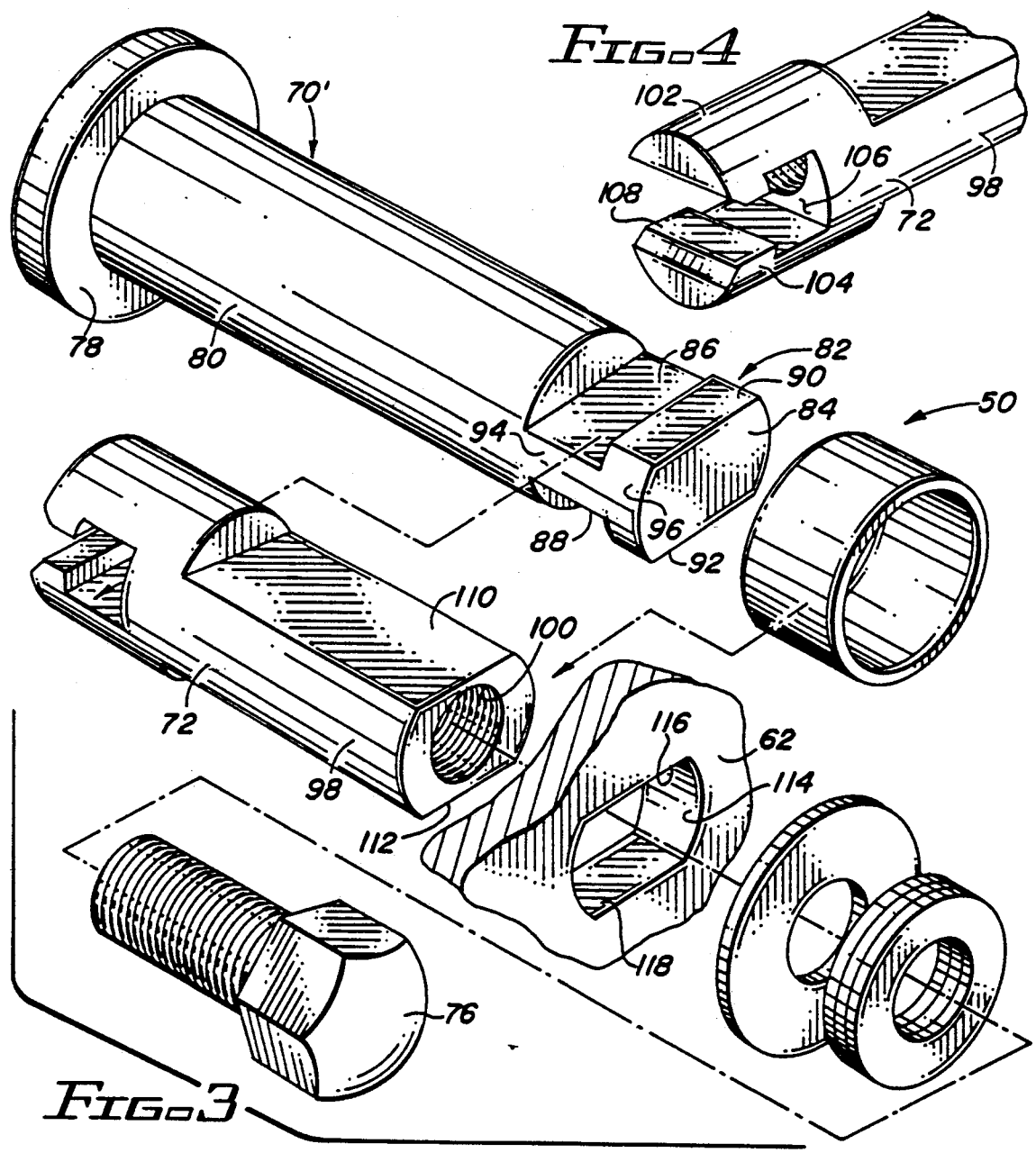
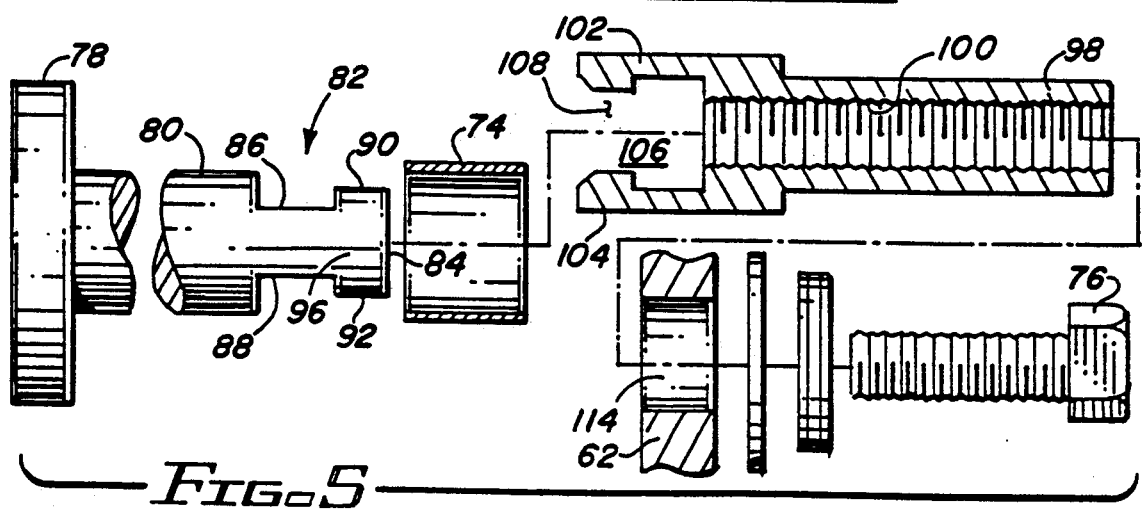

HIGH TEMPERATURE TURBINE ENGINE STRUCTURE

The United States Government has rights in the present invention pursuant to Contract No. DEN3-167 issued and funded by the Department of Energy (DOE), and administered by the National Aeronautics and Space Administration (NASA).

TECHNICAL FIELD

The present invention is in the field of high temperature turbine engine structure. Particularly, the present invention is directed to structure of a high temperature turbine engine composed of both metallic and ceramic components.

BACKGROUND OF THE INVENTION

A long-recognized need in the turbine engine art has been to attain higher operating temperatures in order to achieve both a greater thermodynamic efficiency and an increased power output per unit of engine weight. Ideally, a turbine engine should operate with stoichiometric combustion in order to extract the greatest possible energy value from the fuel consumed. However, the temperatures resulting from stoichiometric and even near-stoichiometric combustion are beyond the endurance capabilities of metallic turbine engine components. Consequently, as the turbine engine art has progressed, an ever greater emphasis has been placed upon both enhanced cooling techniques and the development of temperature and oxidation resistant metals for use in components of the engine which are exposed to the highest temperatures. That is, cooling techniques and high temperature metals have been developed for each of combustion chambers, turbine stator nozzles, and turbine blades. This quest has led to the development of elaborate cooling schemes for all of these components as well as to classes of nickel-based "super alloy" metals which may be cast using directionally solidified or single crystal techniques. All in all, the quest for higher operating temperatures in a turbine engine fabricated of metallic components has led to a still increasing complexity and expense in the making of the engine.

An alternative approach to the attainment of higher operating temperatures in a turbine engine has been recognized. This approach involves the use of high-strength ceramic components in the engine. Ceramic components are better able than metals to withstand the high temperature oxidizing environment of a turbine engine. However, the term "high strength" in connection with ceramic structures must be viewed in context. While many ceramic materials exhibit superior high temperature strength and oxidation resistance, ceramics have historically been difficult to employ in turbine engines because of a comparatively low tensile fracture strength and a low defect tolerance. Consequently, a long-recognized need has been for the development of hybrid ceramic/metallic structures which utilize the characteristics of each material to best advantage in order to allow combustion in a turbine engine to take place closer to or at the stoichiometric level.

SUMMARY OF THE INVENTION

In view of the deficiencies of the conventional turbine engine art, and of the materials of construction and structural techniques available for making such engines, it is a primary object for this invention to provide a hybrid ceramic/metallic fastener for use in a high temperature turbine engine.

Particularly, it is an object of this invention to provide a hybrid ceramic/metallic fastener wherein a ceramic portion may be disposed in a high temperature part of a turbine engine to retain and support another ceramic component, and to extend therefrom toward a lower temperature engine part. The metallic portion of the fastener cooperatively interengages with the ceramic portion and includes provision for engaging other engine structure, which may be metallic, in order to apply a tensile stress to the fastener.

Still more particularly it is an object for this invention to provide interengagement means between an elongate ceramic member and an elongate metallic member both mutually subject to an axial tensile force.

Further to the above, the present invention provides a high temperature hybrid ceramic/metallic fastener comprising an elongate ceramic portion having at one end thereof a head part of comparatively larger diameter, an integral elongate shank part of comparatively smaller diameter extending axially from said head part to an end termination portion thereof; a metallic end fitting defining an axially extending thread defining feature; said end fitting and said shank portion defining cooperating means for intersecuring one to the other to sustain an axially directed tensile force.

An advantage of the present invention resides in the provision of a hybrid ceramic/metallic mechanical fastener wherein the beneficial characteristics of each material are employed to best advantage.

Another advantage of the present invention results from the provision of a turbine engine wherein ceramic component parts having high temperature resistance may be secured to metallic component parts by means of the hybrid ceramic/metallic fastener. That is, the ceramic engine components along with the ceramic portion of the hybrid fastener may be exposed to high temperatures while metallic structures exposed to comparatively cooler structures are employed to support the ceramic components. The metallic portion of the hybrid fastener advantageously cooperates with the metallic support structure of the engine to provide a tensile force in the hybrid fastener.

Additional objects and advantages of the present invention will appear from a reading of the following detailed description of a single preferred embodiment of the invention taken in conjunction with the appended drawing figures.

BRIEF DESCRIPTION OF THE DRAWINGS

FIG. 3 provides an exploded perspective view of a hybrid ceramic/metallic fastener embodying the present invention:

FIG. 4 depicts a part of the hybrid ceramic/metallic fastener in perspective view: and FIG. 5 presents an exploded longitudinal view, partly in cross section, of a hybrid ceramic/metallic fastener embodying the invention.

BEST MODE FOR CARRYING OUT THE INVENTION

Figure 1:
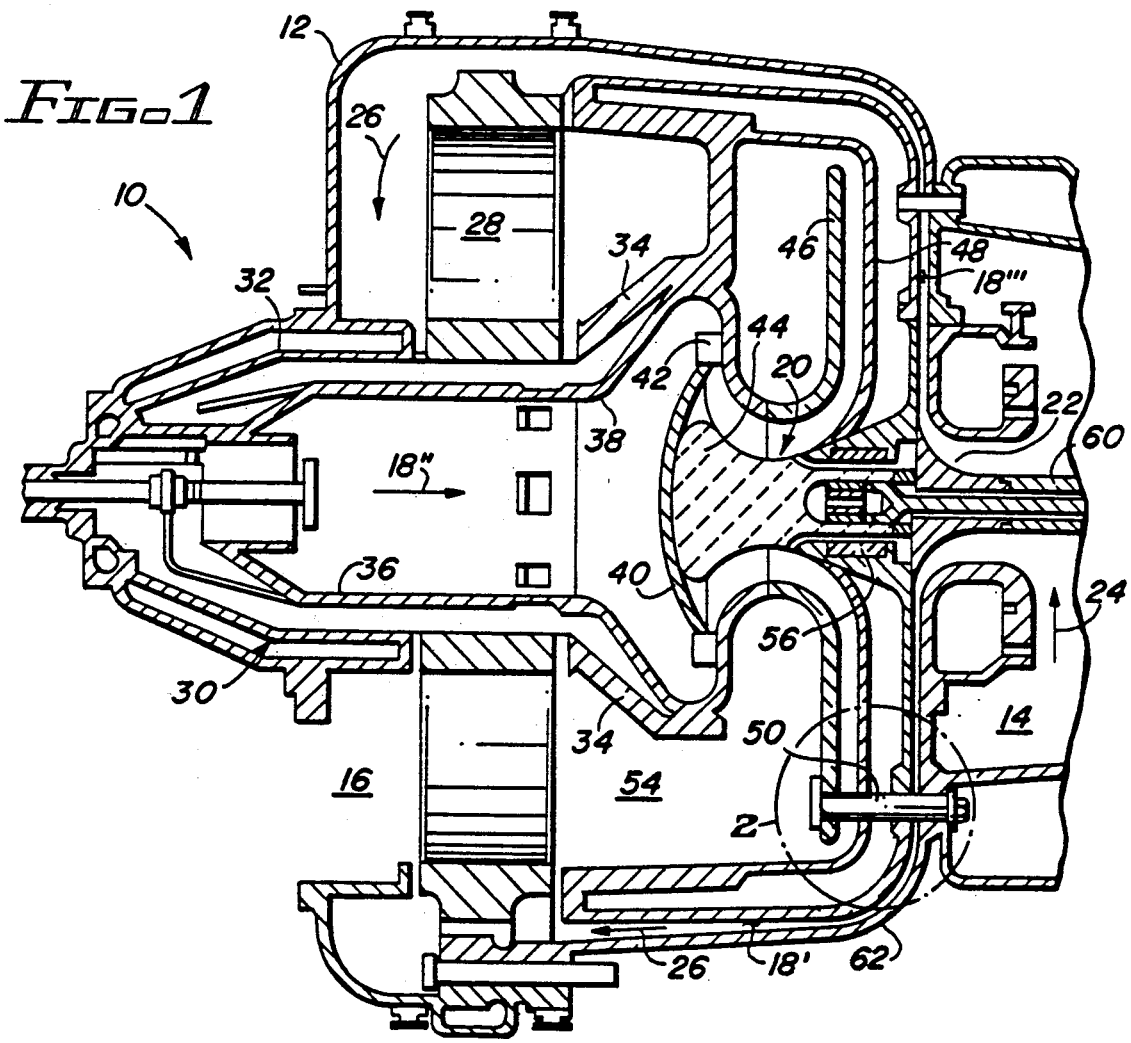
FIG. 1 provides a longitudinal view, partly in cross section of a hybrid ceramic/metallic turbine engine embodying the invention.
Figure 2:
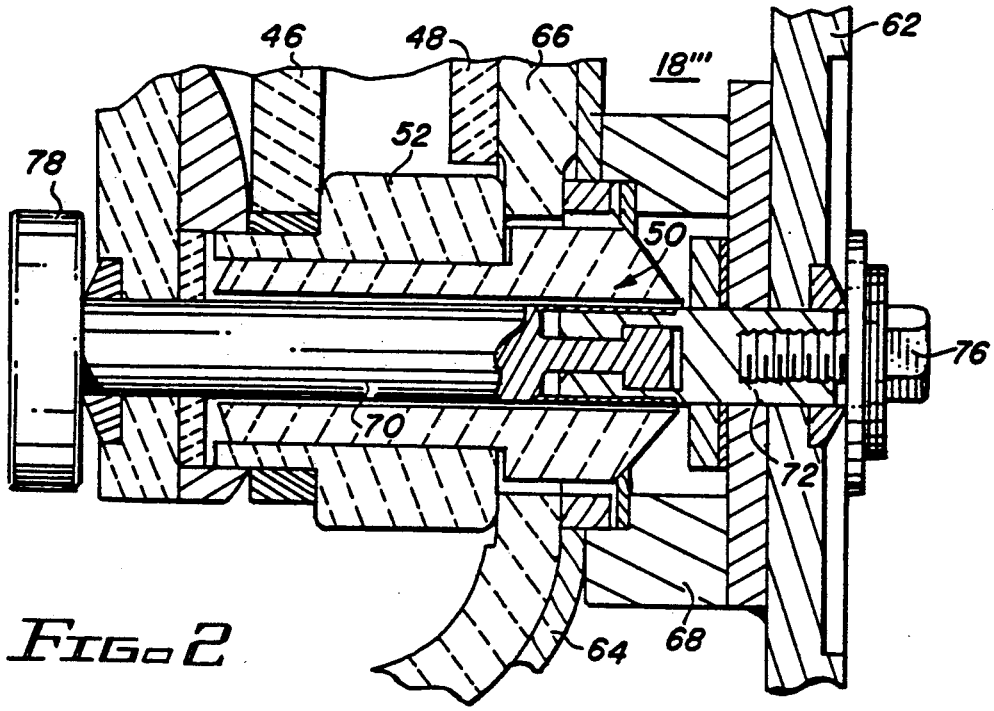
FIG. 2 depicts an enlarged fragmentary cross sectional view of a portion of the engine presented by FIG. 1.

FIG. 1 depicts a hybrid ceramic metallic turbine engine 10. The engine 10 includes a housing 12 which defines an inlet 14, an outlet 16, and a tortuous flow path 18 communicating the inlet 14 with the outlet 16 for conveying a flow of fluid therebetween. A hybrid ceramic/ metallic rotor member generally referenced with the numeral 20 is journaled in the housing 12 and cooperates therewith to bound the flow path 18. It will be seen that the rotor member 20 includes a compressor rotor portion 22, rotation of which inducts ambient air via inlet 14, as indicated by arrow 24, and delivers this air pressurized to a flow path section 18' as indicated by arrow 26.

The flow path section 18' leads axially through a segment of somewhat less than 180° of a rotary annular regenerator member 28 which is received in the housing 12. Downstream of the regenerator 28, the flow path 18 leads through an axially extending combustion structure generally referenced with the numeral 30. The combustor structure 30 is fabricated of ceramic material and includes a ceramic outer liner 32 which is supported at one end by a generally cone-shaped outer transition member 34. A ceramic inner combustion liner 36 is coaxially disposed within the outer liner 32, and is supported at one end on a ceramic transition duct member 38. The flow path 18 leads axially toward the one end of the combustion liner 36, as indicated by arrow 18". Within the transition duct member 38, a ceramic turbine back shroud member 40 and a ceramic turbine stator member 42 cooperatively define the flow path 18, and lead the latter radially inwardly to a ceramic turbine rotor portion 44 of the rotor member 20.

Downstream of the turbine rotor portion 44, the flow path 18 extends axially and radially outwardly between a pair of spaced apart cooperative ceramic exhaust duct members, respectively referenced with the numerals 46,48. A plurality of hybrid ceramic/metallic fastener members 50 (one of which is visible in FIG. 1) cooperatively engage the one exhaust duct member 46 and the housing 12. A ceramic spacer member 52 received over the fastener members 50 spaces apart the duct members 46,48.

Subsequent to the exhaust duct members 46,48, the flow path 18 leads to an exhaust chamber generally referenced with the numeral 54. A segment of somewhat less than 180° of the ceramic regenerator member 28 is exposed to the exhaust chamber 54. Consequently, the flow path 18 leads once again through the regenerator member 28, and to ambient via the outlet 16.

In order to complete this description of the engine 10, it must be noted that in the combustor 30 fuel is added to the pressurized air flowing from compressor rotor 22 to support combustion. This combustion results in a flow of high temperature pressurized combustion products flowing downstream in the combustor 30, and in flow path 18 subsequent to the combustor. Also, the rotor member 20 is journaled in housing 12 by a journal bearing 56 disposed between the rotor portions 22 and 44, and a rolling element bearing (not visible in the Figures) disposed adjacent a metallic power output shaft portion 60 (only a portion of which is visible in FIG. 1) of the rotor member 20.

Viewing now FIGS. 2 through 5 in conjunction, it will be seen that engine housing 12 includes a metallic outer support structure portion, generally referenced with the numeral 62. Disposed within the support structure 62, and spaced axially and radially therefrom to cooperatively define therewith a compressor diffuser portion 18''' of flow path 18, is a metallic inner support structure 64. Nested within the metallic support structures 62 and 64 is a ceramic cup-like heat shield member 66, and the ceramic exhaust duct members 46, 48. The exhaust duct member 46 is spaced away from member 48 by a ceramic spacer 52 received over a hybrid ceramic-metallic fastener 50, as mentioned above. The duct member 48, heat shield 66 and inner metallic support structure 64 are stacked together. The inner support structure 64 is spaced from outer structure 62 by a metallic spacer member 68 received over the fastener 52. Three of the spacers 52 equally circumferentially disposed are employed to support and locate members 46, 48, 64, 50 and 68 in the housing 12, all with reference to the outer support structure 62.

The hybrid ceramic/metallic fastener 50 includes a ceramic part generally referenced with the numeral 70, a metallic end fitting 72, a metallic sleeve portion 74, and a conventional metallic cap screw 76. The ceramic part 70 includes a head part 78 of comparatively larger diameter and an elongate shank part 80 of comparatively smaller diameter extending from the head part 78 to terminate in a shank end termination portion 82. Defined upon the end portion 82 and spaced from an end surface 84 thereof are a pair of transversely extending diametrically opposite grooves or flats 86,88. A pair of flats 90,92 extend respectively from the pair of grooves 86,88, to the end 84 of the shank 80. As a result of the grooves 86,88, and flats 90,92, it can be seen that the shank 80 terminates in end portion 82 having a flattened tang 94 carrying a flattened bulbular enlargement 96.

The metallic end fitting 72 is received upon the end portion 82 of the shank 80. The fitting 72 includes an axially elongate annular portion 98 having a thread-defining bore 100 extending axially therethrough. Extending axially from the annular portion 98 is a pair of confrontingly disposed generally J-shaped tongues 102,104. These tongues 102,104 cooperatively define a necked transverse slot 106 having a reduced-width neck 108. The metallic end fitting 72 is received transversely onto the end portion 82 of shank 80 so that these two are axially aligned one with the other. That is, the tang 94 is received in neck 108 while the bulbular enlargement 96 is received in the remainder of slot 106. Thereafter, the sleeve portion 74 is passed axially over the end fitting 72 in order to block the slot 106 and capture end portion 82 therein. Sleeve portion 74 is welded to end fitting 72 to permanently trap the shank 80 and end portion 82 thereof in the end fitting 72. The conventional cap screw 76 threadably engages the end fitting at bore 100 to impose a tensile force on the fastener 50.

Viewing FIGS. 3, 4 and 5 in particular, it will be seen that the end fitting 72 also defines a pair of axially extending diametrically opposite external flats 110,112. In order to isolate the ceramic part 70 from torque imposed upon the end fitting 72 when the cap screw 76 is tightened during assembly of the fastener, the outer support structure 62 defines a through hole 114 nonrotatably receiving the end fitting 72. In other words, the hole 114 includes a pair of axially extending flats 116,118 engaging flats 110,112 of the fitting 72. When the cap screw 76 is torqued, this torque is reacted by the outer support structure 62, and the ceramic part 70 is exposed only to tensile stress without torque.

Returning to FIG. 1, it will be seen that the metallic cap screw 76 engages metallic support structure 62, while the head portion 78 engages the ceramic exhaust duct 46. An advantage of the fastener 50 is the high resistance to axial heat conduction offered by the ceramic part 70. That is, even though head portion 78, and part of the shank 80 adjacent to head portion 78, are exposed to temperatures as high as about 2500° F. (1370° C.), the length and relatively low heat conductivity of the shank 80 allow metallic material to be employed at end fitting 72.

While the present invention has been depicted and described by reference to a single preferred embodiment of the invention, such reference does not imply any limitation upon the invention, and no such limitation is to be inferred. The invention is intended to be limited only by the spirit and scope of the appended claims, which provide additional definition of the invention.

What is claimed is:

1. A high temperature hybrid ceramic/metallic fastener comprising:
   an elongate ceramic portion having at one end thereof a head part of comparatively larger diameter, an integral elongate shank part of comparatively smaller diameter extending axially from said head part to an end termination portion thereof;
   a metallic end fitting defining an axially extending thread defining feature, and reacting means for cooperating with a housing receiving said fastener for reacting torque applied to said end fitting via said thread defining feature;
   said end fitting and said shank portion defining cooperating means for coaxially intersecuring one to the other to sustain an axially directed tensile force, whereby said ceramic portion is subjected only to said tensile force and is isolated by said torque reacting means from torque applied to said thread defining feature.

2. The invention of claim 1 wherein said cooperating means comprises said shank end termination portion defining an axially extending tang carrying a flattened bulbular enlargement, said enlargement defining an end of said shank portion, said end fitting defining a transversely extending slot opening axially and matching said tang and enlargement, and said end fitting at said slot thereof being received transversely on said shank portion end termination portion in coaxial alignment therewith.

3. The invention of claim 2 further including means capturing said shank portion end termination portion within said transverse slot of said end fitting.

4. The invention of claim 3 wherein said transverse slot opens outwardly at opposite ends thereof on said end fitting, said capturing means including an elongate metallic sleeve member closely received axially over said end fitting portion and closing said slot ends to trap said end termination portion therein.

5. The invention of claim 1 wherein said thread defining feature includes said end fitting defining an axially extending bore coaxial with said fastener ceramic portion, and said axially extending bore including a thread-defining part thereof.

6. The invention of claim 1 wherein said end termination portion comprises said shank port defining two pair of diametrically opposite transversely spaced apart and substantially parallel flats which are spaced axially along said shank portion, each of said pair of flats defining a respective dimension therebetween transverse to said shank portion, and the one of said pair of flats closer to a proximate end of said shank portion having a greater transverse dimension than the other of said two pair of flats.

7. The invention of claim 1 wherein said cooperating means comprises said end fitting including a pair of transversely spaced apart axially extending and substantially parallel tongue portions, each one of said pair of tongue portions being substantially J-shaped in transverse view and confronting the other of said pair of tongue portions to define an axially extending transverse slot opening axially in a neck portion of comparatively smaller transverse dimension.

8. The invention of claim 7 wherein said end portion is received transversely into said transverse slot.

9. The invention of claim 8 further including a metallic locking sleeve member received axially over said end fitting and trapping said end portion within said transverse slot.

10. The invention of claim 1 wherein said reacting means comprises said end fitting including an axially elongate portion cooperable axially slidably and nonrotationally with said housing to react torque applied to said thread defining portion.

11. The invention of claim 10 wherein said elongate portion of said end fitting defines at least one elongate torque-transmitting feature cooperable with said housing to react torque applied to said thread defining feature.

12. The invention of claim 11 wherein said torque transmitting feature includes an elongate flat extending axially on said end fitting.

* * * * *